(12) United States Patent
Wang et al.

(10) Patent No.: US 7,156,351 B2
(45) Date of Patent: Jan. 2, 2007

(54) DISPLAY AUTO-LOCKING STRUCTURE

(75) Inventors: Wen-Chieh Wang, Taipei (TW); Chin-Ku Chuang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 297 days.

(21) Appl. No.: 10/976,896

(22) Filed: Nov. 1, 2004

(65) Prior Publication Data

US 2006/0059749 A1   Mar. 23, 2006

(30) Foreign Application Priority Data

May 5, 2004   (TW) ................................ 93112645 A

(51) Int. Cl.
*F16L 3/00* (2006.01)
(52) U.S. Cl. ....................... 248/121; 248/919; 248/923; 361/683
(58) Field of Classification Search ................ 248/917, 248/918, 919, 920, 921, 922, 923, 122.1, 248/121, 125.7, 125.9, 133, 134, 136, 140, 248/142; 312/7.2; 348/825, 831; 361/680, 361/683, 724, 725, 726, 681

See application file for complete search history.

(56) References Cited

U.S. PATENT DOCUMENTS

| | | | | |
|---|---|---|---|---|
| 5,224,060 A | * | 6/1993 | Ma | ............................. 361/681 |
| 5,559,670 A | * | 9/1996 | Flint et al. | ................... 361/681 |
| 6,980,425 B1 | * | 12/2005 | Chuang et al. | ............. 361/683 |
| 6,985,356 B1 | * | 1/2006 | Wang | ......................... 361/683 |
| 2004/0090740 A1 | * | 5/2004 | Tseng et al. | ................ 361/683 |
| 2004/0125549 A1 | * | 7/2004 | Iredale | ........................ 361/681 |
| 2004/0140410 A1 | * | 7/2004 | Tsai | ........................ 248/291.1 |
| 2005/0063145 A1 | * | 3/2005 | Homer et al. | ................ 361/683 |
| 2005/0128690 A1 | * | 6/2005 | Chuang et al. | ............. 361/681 |
| 2006/0007644 A1 | * | 1/2006 | Huilgol et al. | .............. 361/681 |

* cited by examiner

*Primary Examiner*—A. Joseph Wujciak, III
(74) *Attorney, Agent, or Firm*—Bacon & Thomas, PLLC

(57) ABSTRACT

A display auto-locking structure includes a base member, an open frame pivoted to the base member and rotatable relative to the base member, a display pivotally mounted within the open frame and rotatable relative to the open frame, and a spring-supported cam rod mounted inside the open frame for locking the display to the open frame after the display has been set in one of two reversed positions within the open frame and for enabling the display to be rotated relative to the open frame after the open frame has been rotated relative to the base frame to a predetermined angle.

6 Claims, 5 Drawing Sheets

DISPLAY AUTO-LOCKING STRUCTURE

BACKGROUND OF THE INVENTION

1. Field of the Invention

The present invention relates to a display auto-locking structure and more particularly, to such a display auto-locking structure, which designed for use in a dual-usage portable computer to automatically lock the swivel display of the portable computer.

2. Description of Related Art

A dual-usage portable computer essentially comprises a base member, a display, and an open frame. The display is pivoted to the inside of the open frame, and rotatable relative to the open frame. The open frame is hinged to the base member and rotatable relative to the base member.

The aforesaid base member has a keyboard mounted thereon. When the display is rotatable relative to the open frame and closely attached to the open frame on the top side of the base member, the portable computer is used as a tablet PC. On the contrary, when lifted the display with the open frame from the base member with the display screen of the display facing the face of the user, the portable computer is used as a notebook computer. Therefore, this design of portable computer is called "dual-usage" portable computer.

In the aforesaid design, the portable computer has no means to lock the display to the open frame in the selected position. Further, the locating device commonly used in a conventional dual-usage portable computer for quick positioning such as hinge or the like requires much installation space and, wears quickly with use.

SUMMARY OF THE INVENTION

The present invention has been accomplished under the circumstances in view. It is therefore the main object of the present invention to provide a display auto-locking structure, which is easy to manufacture and to install. It is another object of the present invention to provide a display auto-locking structure, which is durable in use. It is still another object of the present invention to provide a display auto-locking structure, which requires less installation space.

To achieve these and other objects of the present invention, the display auto-locking structure comprises a base member, an open frame, and a display. The base member has a top surface. The open frame is comprised of a left frame bar, a right frame bar, a top frame bar, and a bottom frame bar. The frame bars of the open frame define a mounting space. The bottom frame bar is pivotally pivoted to one lateral side of the top surface of the base member such that the open frame is rotatable relatively to the base member and closely attachable to the top surface of the base member. The display is pivoted to the open frame within the mounting space and horizontally rotatable relative to the open frame, having a left side surface, a right side surface, a top side surface, and a bottom side surface. Further, the display comprises at least two recessed locating holes respectively formed in the bottom side surface at two symmetrically opposite ends thereof. The open frame comprises at least one locating groove in a bottom side of the bottom frame bar corresponding to one of the at least two recessed locating holes of the display, at least one through hole formed in the bottom frame bar in communication between the at least one locating groove and the mounting space, at least one spring member received inside the at least one locating groove, and at least one cam rod mounted inside the at least one locating groove and supported by the at least one spring member. Each the cam rod comprises an insertion tip disposed at one end thereof and a cam base disposed at an opposite end thereof. The cam base has a cam profile forced downwards by the at least one spring member toward the top surface of the base member. When rotated the open frame to a particular angle relative to the base member, the insertion tip of the at least one cam rod is forced upwards by the top surface of the base member to engage into the corresponding recessed locating hole of the display when the cam base is rotated to an engaged position, and therefore the display is locked to the open frame. When rotated the open frame away from the particular angle, the at least one spring member forces the at least one cam rod from the corresponding recessed locating hole to unlock the display from the open frame, for enabling the display to be rotated within the open frame to the desired position. In an alternate form of the present invention, the display is made vertically rotatable within the mounting space relative to the open frame, and has recessed locating holes in the top and bottom sides respectively for receiving the insertion tip of the cam rod in the bottom frame bar of the open frame selectively.

DETAILED DESCRIPTION OF THE PREFERRED EMBODIMENT

Figure 1:
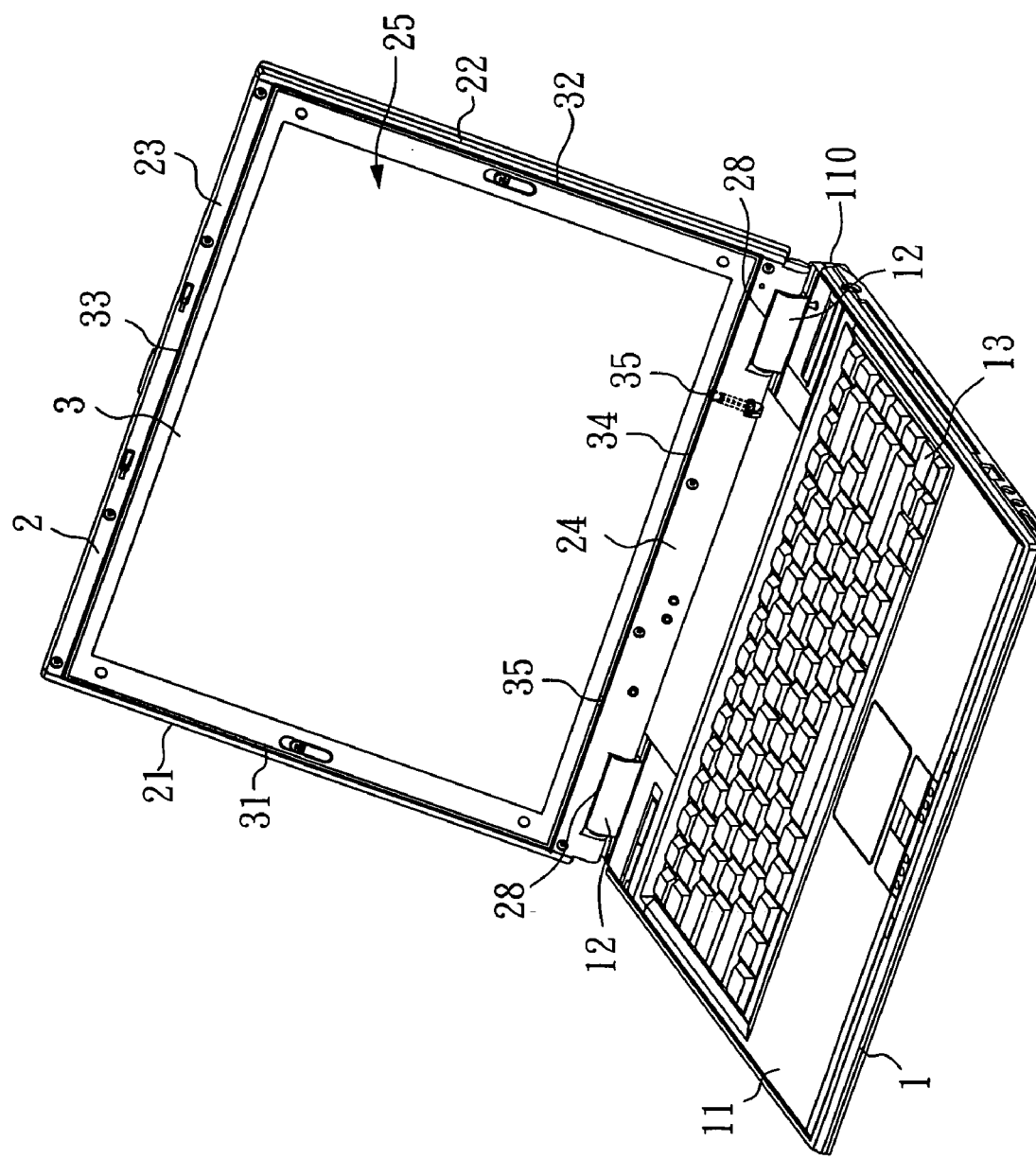
FIG. 1 is a perspective view of a display auto-locking structure constructed according to the first embodiment of the present invention.
Figure 2:
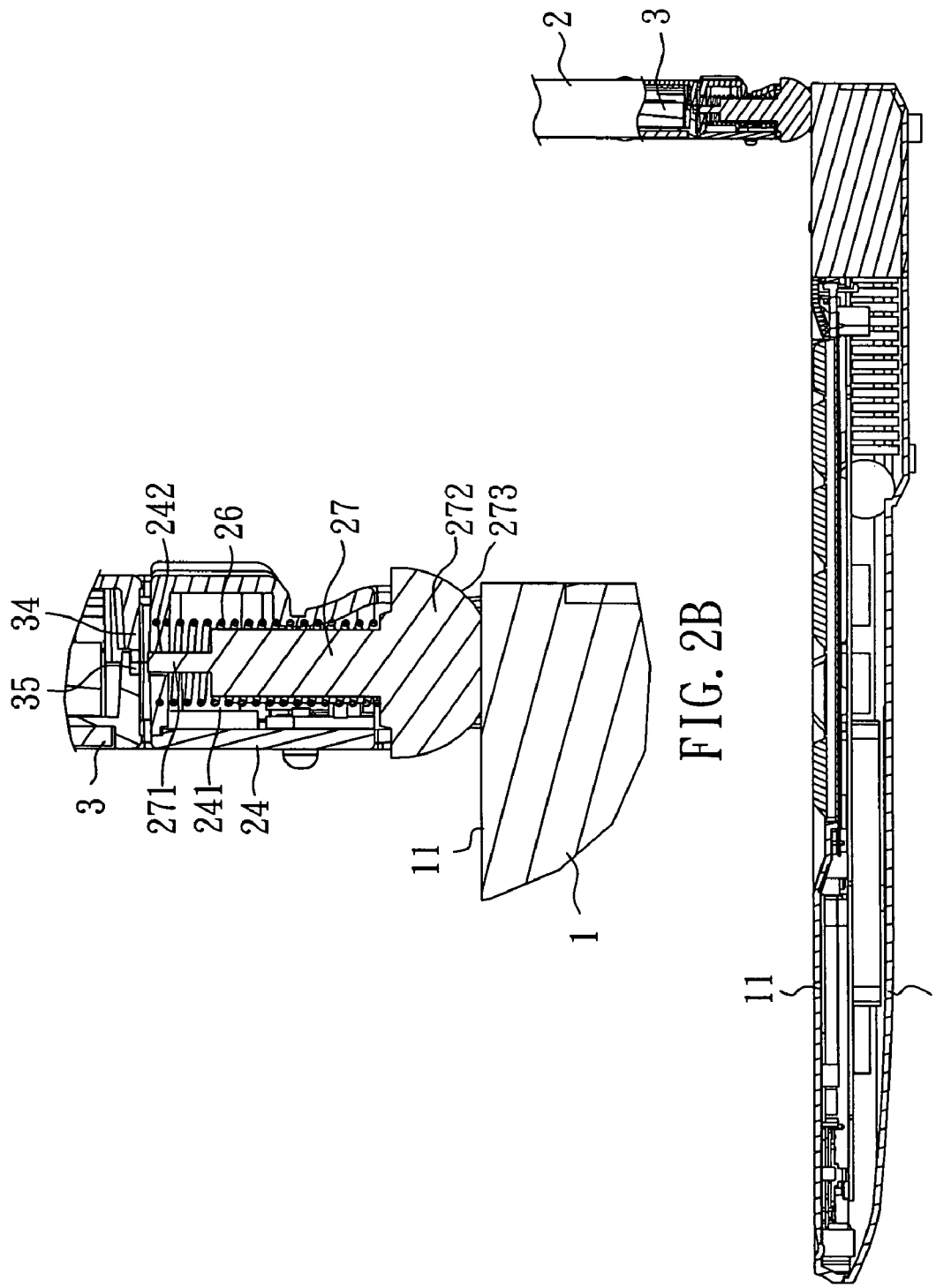
FIG. 2A is a sectional view of a part of the first embodiment of the present invention, showing the cam rod disengaged from the display.
FIG. 2B is an enlarged view of a part of FIG. 2A.

Referring to FIG. 1, FIG. 2A and FIG. 2B, a display auto-locking structure in accordance with the first embodiment of the present invention is shown comprising a base member 1, an open frame 2, and a display 3.

The base member 1 has a top surface 11, a keyboard 13 mounted on the top surface 11, and two pivots 110 axially aligned at one lateral side 110 of the base member 1. The open frame 2 comprises a left frame bar 21, a right frame bar 22, a top frame bar 23, and a bottom frame bar 24. The frame bars 21~24 define a mounting space 25. The bottom frame bar 24 has two pivot holes 28 respectively pivotally pivoted to the pivots 110 such that the open frame 2 can be rotated relatively to the base member 1 and closely attached to the top surface 11 of the base member 1.

The display 3 has a left side surface 31, a right side surface 32, a top side surface 33, and a bottom side surface 34. The top side surface 33 and bottom side surface 34 of the display 3 has the respective middle point respectively pivoted to the top frame bar 23 and bottom frame bar 24 of the open frame 2 such that the display 3 can be rotated horizontally within the mounting space 25 relative to the open frame 2.

The display 3 has two recessed locating holes 35 respectively formed in the bottom side surface 34 and equally spaced from the mid point of the bottom side surface 34 at a distance. The bottom frame bar 24 of the open frame 2 has a locating groove 241 in the bottom side corresponding to the recessed locating holes 35 of the display 3, and a through hole 242 extended through the top and bottom sides in communication between the locating groove 241 and the mounting space 25. The locating groove 241 has a spring member 26 and a cam rod 27 mounted therein. The spring member 26 according to this embodiment is a spiral spring sleeved onto the cam rod 27. The cam rod 27 comprises a cam base 272 and an insertion tip 271. The cam base 272 has a cam profile 273, which is forced downwards by the downward elastic prestress of the spring member 26 against the top surface 11 of the base member 1. The insertion tip 271 is inserted into the corresponding through hole 242.

Figure 3:
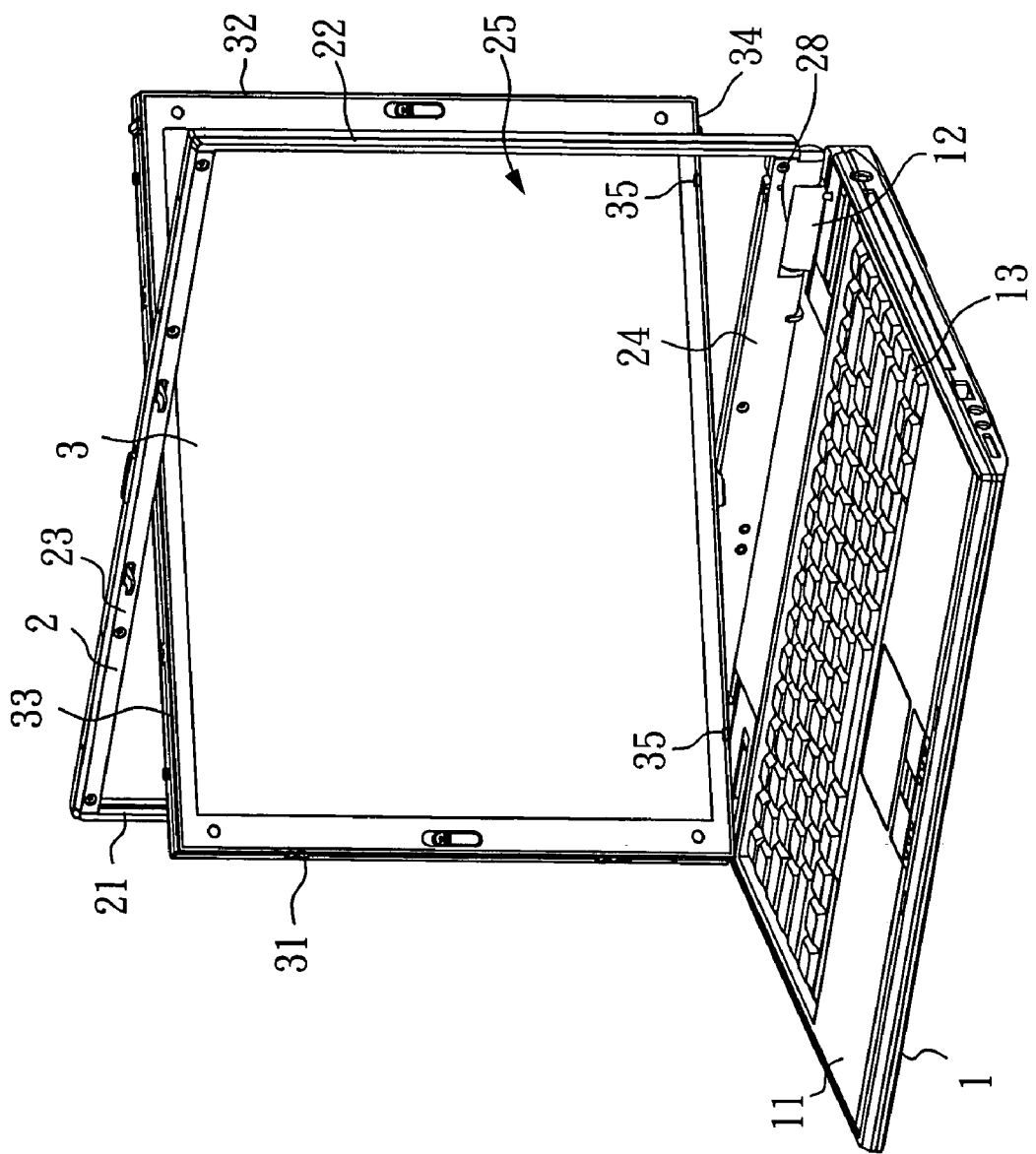
FIG. 3 is a schematic drawing of the first embodiment of the present invention, showing the display unlocked and rotated relative to the open frame.

Referring to FIG. 3 and FIG. 1, FIG. 2A and FIG. 2B again, when rotated the open frame 2 to a particular angle relative to the base member 1, the cam profile 273 of the cam base 272 is rotated with the open frame 2. At this time, the elastic prestress of the spring member 26 forces the cam rod 27 downwards to disengage the insertion tip 271 out of the corresponding locating hole 35 in bottom side surface 34 of the display 3, thereby allowing the display 3 to be rotated horizontally leftwards or rightwards.

Figure 4:
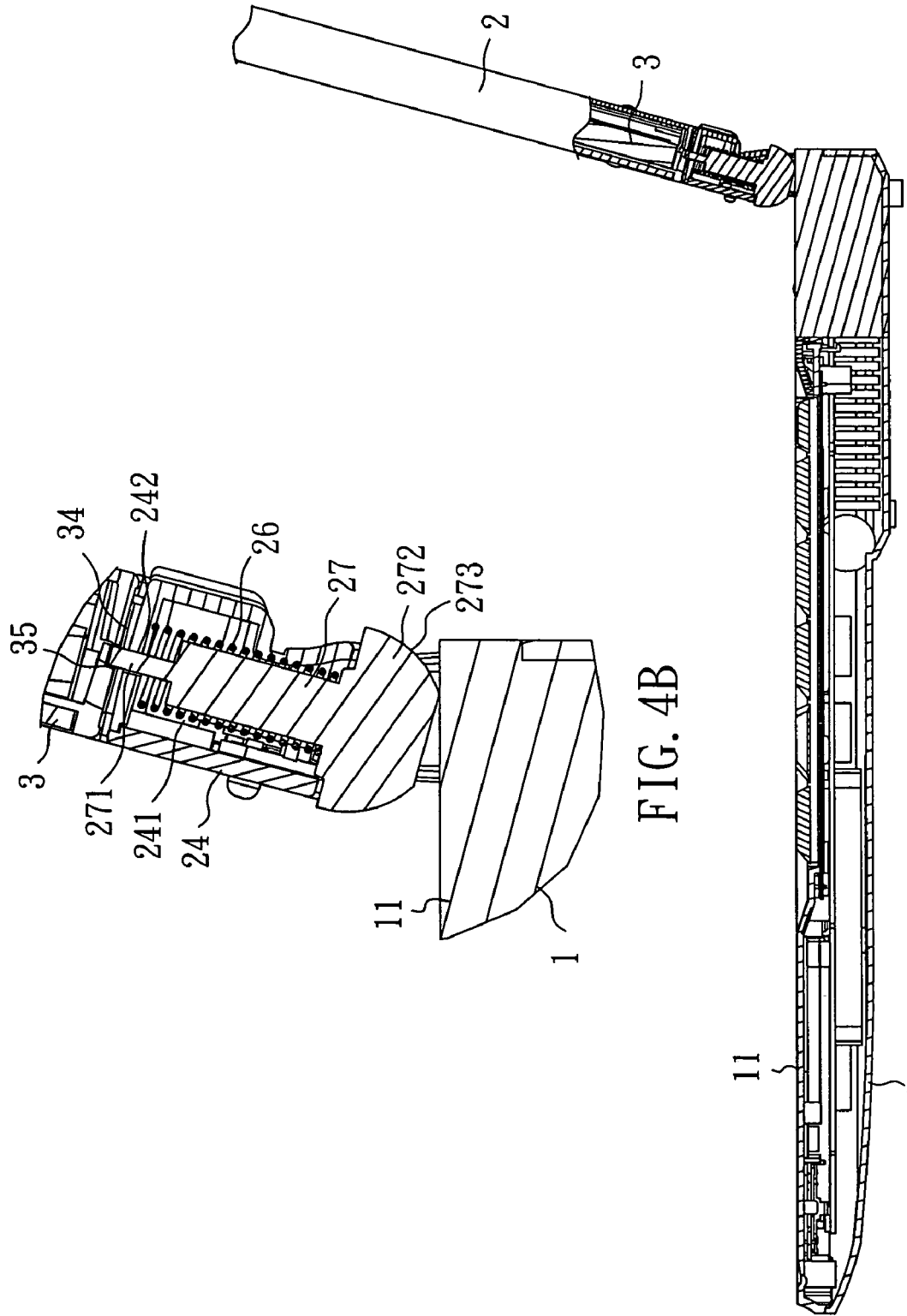
FIG. 4A is a sectional view of a part of the first embodiment of the present invention, showing the cam rod engaged into the respective recessed locating hole in the display.
FIG. 4B is an enlarged view of a part of FIG. 4A.

Referring to FIG. 4A and FIG. 4B and FIG. 3 again, after the display 3 has been rotated to the desired position, which is so called an engaged position, the open frame 2 is rotated relative to the base member 1 away from the aforesaid particular angle and forced upwards by the top surface 11 of the base member 1, thereby causing the insertion tip 271 of the cam rod 27 to engage into the corresponding locating hole 35 in the bottom side surface 34 of the display 3, and therefore the display 3 is locked to the open frame 2.

By means of the simple structural design of the cam rod 27 and the locating groove 241 and the application of the principle of cam produced by the cam profile 273 of the cam base 272 of the cam rod 27, the invention achieves the expected effects. The cam rod 27, the locating groove 241 and the spring member 26 can be miniaturized to effectively reduce installation space. Further, the aforesaid structural design eliminates the problem of friction between parts.

Figure 5:
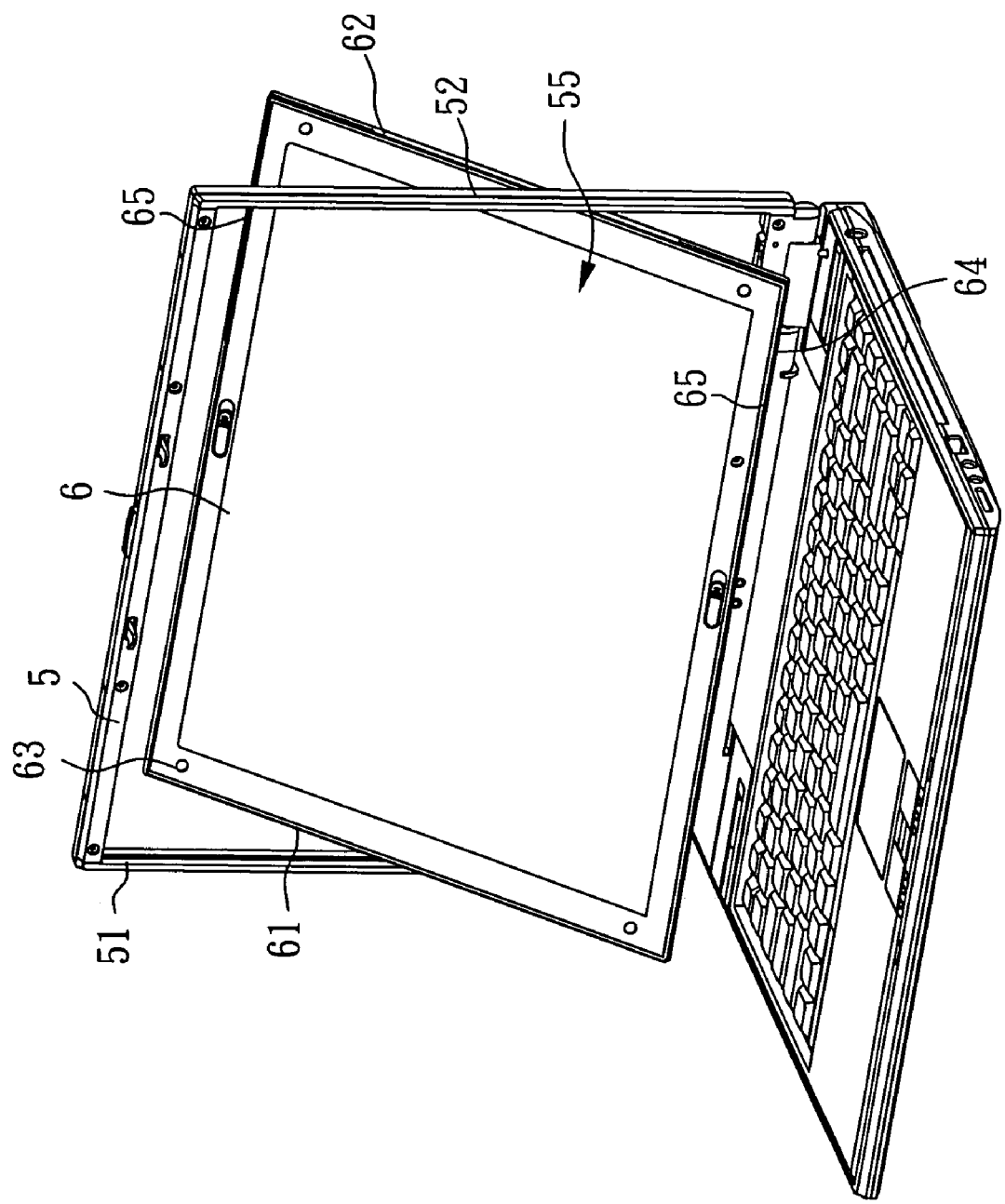
FIG. 5 is a schematic drawing of the second embodiment of the present invention, showing the display unlocked and rotated relative to the open frame.

FIG. 5 shows a display auto-locking structure constructed according to the second embodiment of the present invention. This embodiment is substantially similar to the aforesaid first embodiment with the exception of the design of the direction of rotation of the display. According to the aforesaid first embodiment, the display 3 is horizontally rotatable within the open frame 2 (see FIG. 3). According to this second embodiment, the display 6 is vertically rotatable within the open frame 5.

As illustrated in FIG. 5, the left side surface 61 and right side surface 62 of the display 6 have the respective mid point respectively pivoted to the left frame bar 51 and right frame bar 52 of the open frame 5. The top side surface 63 and bottom side surface 64 of the display 6 each have a recessed locating hole 65 corresponding to the cam rod (not shown) inside the open frame 5. By means of the application of the aforesaid principle of cam, the display 6 can be locked to the open frame 5, or unlocked from the open frame 5 for vertical rotation relative to the open frame 5.

Although the present invention has been explained in relation to its preferred embodiment, it is to be understood that many other possible modifications and variations can be made without departing from the spirit and scope of the invention as hereinafter claimed.

What is claimed is:

1. A display auto-locking structure comprising:
a base member, said base member having a top surface;
an open frame, said open frame having a left frame bar, a right frame bar, a top frame bar, and a bottom frame bar, said left frame bar defining with said right frame bar, said top frame bar and said bottom frame bar a mounting space, said bottom frame bar being pivotally pivoted to one lateral side of the top surface of said base member to let said open frame rotatable relatively to said base member and closely attachable to the top surface of said base member; and
a display pivoted to said open frame within said mounting space and horizontally rotatable within said mounting space relative to said open frame, said display having a left side surface, a right side surface, a top side surface, and a bottom side surface;
wherein said display comprises at least two recessed locating holes respectively formed in said bottom side surface at two symmetrically opposite ends thereof; said open frame comprises at least one locating groove in a bottom side of said bottom frame bar corresponding to one of the at least two recessed locating holes of said display, at least one through hole formed in said bottom frame bar in communication between said at least one locating groove and said mounting space, at least one spring member received inside said at least one locating groove, and at least one cam rod mounted inside said at least one locating groove and supported by said at least one spring member, each said cam rod comprising an insertion tip disposed at one end thereof and a cam base disposed at an opposite end thereof, said cam base having a cam profile forced downwards by said at least one spring member toward the top surface of said base member, said insertion tip inserted into the at least one through hole of said open frame and adapted to engage into the corresponding recessed locating hole of said display to further lock said display to said open frame when said cam base rotated to an engaged position.

2. The display auto-locking structure as claimed in claim 1, wherein said spring member is a spiral spring.

3. The display auto-locking structure as claimed in claim 1, wherein said base member comprises two pivots axially aligned at the lateral side of said top surface thereof; the bottom frame bar of said open frame comprises two pivot holes respectively pivoted to the pivots of said base member.

4. A display auto-locking structure comprising:
a base member, said base member having a top surface;
an open frame, said open frame having a left frame bar, a right frame bar, a top frame bar, and a bottom frame bar, said left frame bar defining with said right frame bar, said top frame bar and said bottom frame bar a mounting space, said bottom frame bar being pivotally pivoted to one lateral side of the top surface of said base member to let said open frame rotatable relatively to said base member and closely attachable to the top surface of said base member; and
a display pivoted to said open frame within said mounting space and vertically rotatable within said mounting space relative to said open frame, said display having a left side surface, a right side surface, a top side surface, and a bottom side surface;
wherein said display comprises at least two recessed locating holes formed in said top side surface and said bottom side surface respectively at corresponding opposite positions thereof; said open frame comprises at least one locating groove in a bottom side of said bottom frame bar corresponding to one of the at least two recessed locating holes of said display, at least one through hole formed in said bottom frame bar in communication between said at least one locating groove and said mounting space, at least one spring member received inside said at least one locating groove, and at least one cam rod mounted inside said at least one locating groove and supported by said at least one spring member, each said cam rod comprising an insertion tip disposed at one end thereof and a cam base disposed at an opposite end thereof, said cam base having a cam profile forced downwards by said at least one spring member toward the top surface of said base member, said insertion tip inserted into the at least one through hole of said open frame and adapted to selectively engage into the corresponding recessed locating hole of said display to further lock said display to said open frame when said cam base rotated to an engaged position.

5. The display auto-locking structure as claimed in claim 4, wherein said spring member is a spiral spring.

6. The display auto-locking structure as claimed in claim 4, wherein said base member comprises two pivots axially aligned at the lateral side of said top surface thereof; the bottom frame bar of said open frame comprises two pivot holes respectively pivoted to the pivots of said base member.

* * * * *